United States Patent [19]
Geffcken et al.

[11] 3,713,869
[45] Jan. 30, 1973

[54] METHOD OF APPLYING HARD INORGANIC LAYERS TO PLASTICS

[75] Inventors: Walter Geffcken; Volker Raquet, both of Mainz; Helmut Dislich, Budenheim; Hubert Dutz, Mainz; Hans-Otto Mulfinger, Ingelheim, all of Germany

[73] Assignee: JENAer Glaswerk Schott & Gen., Mainz, Germany

[22] Filed: June 9, 1971

[21] Appl. No.: 151,427

[52] U.S. Cl. ............117/70 A, 117/72, 117/93.1 GD, 117/106 R, 117/138.8 R, 117/138.8 A, 204/165
[51] Int. Cl. ..............................................B44d 1/14
[58] Field of Search...117/93.1 GD, 70 A, 72, 106 R, 117/138.8 R, 138.8 A; 204/164, 165

[56] References Cited

UNITED STATES PATENTS

| | | | |
|---|---|---|---|
| 3,387,991 | 6/1968 | Erchak | 117/93.1 GD |
| 3,437,515 | 4/1969 | Quinn et al. | 117/138.8 R |
| 3,449,154 | 6/1969 | Katz | 117/93.1 GD |
| 3,645,779 | 2/1972 | Kienel | 117/138.8 R |

*Primary Examiner*—Alfred L. Leavitt
*Assistant Examiner*—John H. Newsome
*Attorney*—Singer, Stern & Carlberg

[57] ABSTRACT

For the purpose of improving the adherence of a hard inorganic layer which is vaporized in vacuum and precipitated on a substratum of a plastic, an intermediate layer is disposed between the inorganic layer and the substratum. This intermediate layer comprises a polymerization layer which is produced by a glow discharge in a low-molecular organic vapor and is precipitated on said substratum. The substratum may comprise, for example, diethylene-glycol-diallyl-carbonate (CR39), polycarbonate or polymethylmetacrylate (PMMA), while as organic substances for the intermediate layer may be used, for example, silicic-acid-methyl, silicic-acid-ethylester, low boiling siloxane and silicon oils. These organic substances are particularly suitable when a glass layer is used as inorganic layer.

7 Claims, 1 Drawing Figure

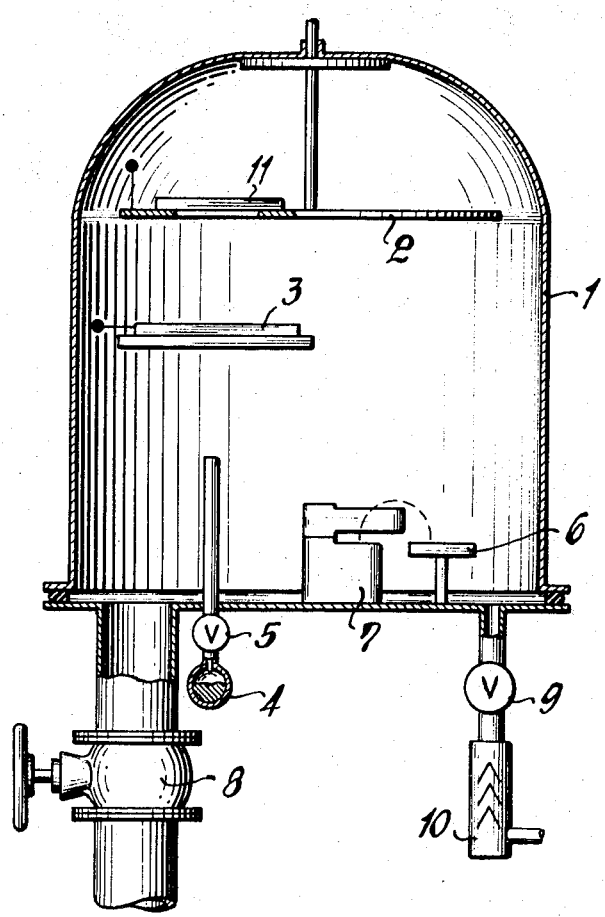

METHOD OF APPLYING HARD INORGANIC LAYERS TO PLASTICS

The invention relates to a method of applying inorganic hard layers of plastics.

It is an object of the invention to increase the adhesive strength of hard inorganic layers which are vaporized in a vacuum on a plastic substratum, particularly a layer consisting of a silicate glass, to such an extent that the inorganic layers, even when subjected to mechanical stress, are not damaged nor do they separate from the plastic substratum. By "hard layers" are to be understood in this connection and in the following description, such layers whose E-modulus is greater than $3 \cdot 10^5$ kg/cm$^2$. Plastics have comparatively an E-modulus amounting at the most to one-tenth of this value. Lead with a value of $1.7 \cdot 10^5$ or indium, for instance, do not count as hard layers. Of particular interest among hard inorganic layers are the ones which are transparent and colorless.

Another object of the invention is to increase the resistivity of such hard layers which are applied to a plastic substratum to temperature changes. As a result of great temperature changes and in view of the extraordinary different thermal expansion of plastic and hard inorganic layer, and also in view of the brittleness of the latter, there are created very high tensions between the substratum and the layer, which do not lead to a destruction or to a chipping off only when the adherence of the layer to the substratum is extremely strong and uniform.

A particular important object of the invention is the production of hard inorganic layers which are vaporized on plastic and which have a high resistivity against water and steam even at high temperatures.

Still another object of the invention is to provide of such layers which even under the influence of organic reagents do not chip off.

In many cases, it is desirable to apply hard inorganic covering layers of small thickness to plastics, either as protection against minor mechanical injuries of the plastic or against the influence of aggressive reagents, whereby the thin layer has particular purposes to fulfill, such as to contain integrated switching networks and the like, or other purposes, In all these cases, it is important that no damage or separation of the layer takes place as a result of a poor adherence of the layer to the base.

Such damages may occur either upon pure mechanical stress or during bending strain. These stresses may also occur during the subsequent finishing, such as during vibrations caused by drilling and sawing. In unfavorable circumstances, it is sufficient when steam enters at room temperature into the layer. For instance, vaporized glass layers split or crack already when breathing on it by the formation of curled foil pieses, when applied without special treatment to polymethyl metacrylate, even when employing the customary glow discharge in air or $O_2$. Still more unfavorable are the conditions when high temperature variations occur. Since the linear extension $\alpha$ of the plastics lies in the order of magnitude of $1 \times 10^{-4}$, while for instance, MgF$_2$ has an $\alpha$ value of approximately $1 \times 10^{-5}$ and a commercial evaporation glass has an $\alpha$ value of $3 \times 10^{-6}$ and since SiO$_2$ as inorganic layer has still greater differences, then during a subsequent heating process, a vaporized glass layer applied to plastics at room temperature leads to tangential stresses and therefore to cracks in the glass layer. If one vaporizes at an increased temperature, then initially the tensions remain small, however, subsequently during the cooling period high tangential pressure forces are generated in the layer. In view of the always present imperfections in the flatness of the surface, there occur always at certain points of the surface normal tensions and shearing strain components which lead to an loosening up of the layer. This is similar to the action of piling up of ice floes in a river during drifting ice. This loosening up can only be eliminated when the layer adheres extremely strongly and uniformly to the base. The same is true to an increased degree when the thermal stresses are superimposed by chemical influences. Therefore, one must count on the fact, that in a steam-saturated atmosphere, the water diffuses through holes and cracks in the layer and leads to local swellings of the surface of the plastics and this leads to additional stesses which effect a splitting off of the layer. In general, this action begins with the formation of bubble-type flaking points in the layer. It has already been proposed to employ different types of agents for obtaining an improved adhesion so as to prevent such a splitting off. It has been proposed, for instance, to apply some type of inorganic lacquer coating to a polymethyl metacrylate substratum layer (PMMA) which has a higher affinity to the inorganic layer than the PMMA. It is true that such produced "adhesive layers" improve the durability, but the expense connected therewith is considerable because such lacquer layers have to be dried dustfree.

Another suggestion concerns the addition of certain organic vapors which are strongly gettered from the evaporized substance and are used as supplemental gas during the vaporizing operation. When this is done, a type of inorganic-organic mixed layer is produced which adheres better than the pure inorganic substance. Even though such produced layers are substantially more resistant than the layers produced without this trick, nevertheless, when the stresses are high, the effect is still not sufficient, particularly when one deals with PMMA. Particularly dangerous are the conditions as they are applied in a climatic test in which a periodic heating to 50°C and a cooling takes place in a saturated (H$_2$O) water. In such a case, the mentioned diffusion of the water and the swelling of the plastic is so intense that even the heretofore known adherence agents fail. In other less-sensitive plastics — such as diethylene glycol diallyl carbonate (CR39) and polycarbonate — a destruction took place when the samples were boiled in water for a short time. Accordingly to the state of the art, up to this time, it was not possible to obtain really satisfying service lives at such stresses.

In accordance with the invention, it was discovered that decidedly better lifetime can be obtained when one applies an adherence transmitting intermediate layer between the substratum and an inorganic hard layer, whereby this intermediate layer comprises a polymerization layer, which is formed when one subjects low-molecular organic vapors to a glow discharge operation and when one deposits the polymerization products on the substratum. Such layers are indeed known per se, but not known have been their excellent suitability as an intermediate layer improving adherence (primer) between plastics and inorganic hard layers. The production of such layers, as is known, may take place in different manner, for instance, by an electrodeless plasma formation with high frequency or simply by applying a low voltage, which may be a direct or alternating voltage, to the space which is next to the surface to be vaporized.

The invention will now be described with reference to the single FIGURE of the drawing which illustrates diagrammatically a preferred embodiment of the arrangement for practicing the method of the invention.

The vacuum vessel is designated by 1; a rotatable supporting device for the substratum to be provided with a vaporized layer is designated by 2. The reference numeral 3 designates a glow electrode of Al-sheet metal which is arranged at an average distance of 80 mm. below the surface to be provided with a vapor deposit. The bottom face of the glow electrode 3 is insulated by a glass plate. The glow electrode 3 is connected to a direct voltage source of about −2 kV. A container 4 is used for the organic substance, for instance silicic methylester. A valve 5 permits the adjustment of the partial pressure of the organic vapor in the vessel 1 to such a value that for each $cm^2$ of the substratum surface subjected to the glow discharge, a current of about 0.1 mA flows. The pressure of the organic substance may then be about a few hundreds Torr. At a lower voltage the adherence layers become too soft, and at too high a voltage the adherence layers discolor to brownish yellow. At too high a current, the thermal load of the plastics is too high and the substratum becomes soft and buckles. If the current is too low, then the glow operation becomes uneconomically long. Useful values lie between .1 to 1 Watt per square centimeter of the surface subjected to the glow discharge. It is possible to determine the economically most favorable value very easily be making a few advanced tests with the plastic to be employed. The thickness of the intermediate adherence layer should be between 30 and 400 A. If the layers are too thin, they produce a worse adherence, while when the layers are too thick they become uneconomical and the layer may assume a slight yellow tint.

As an inorganic hard substance for the vaporization which follows the glow discharge operation, one employs preferably a so-called evaporation glass 6 consisting of $SiO_2$, $B_2O_3$, $Al_2O_3$ and $Na_2O$, which is vaporized by means of an electron gun 7. Even though the mentioned examples are principally directed to this substance, nevertheless, it is within the scope of the invention to employ also other inorganic materials taken from conventional thin-layer substances, such as $SiO_2$, cerium oxide, tin oxide, indium oxide, lead oxide, the sulfides, selenides and tellurides of zinc and cadmium, fluorides, for instance, of MG, Y, al. Li, Th, Pb, Ba, La, Ce, silicates and borates of the alkaline earths, metals such as Fe, Cu, Cr, as hard inorganic layers, because in all these heretofore investigated materials a pronounced improvement of adherence takes place. Generally it is a process improving adherence of the respective hard inorganic layers to a massive plastic substratum.

The number of usable organic compositions whose glow polymerization produces adherence-improving layers is extremely large. One may employ aliphatic substances, for instance acetylene, or aromatic substances, such as xylol. For reasons of the apparatus, however, it is advisable to select such substances which already at room temperature have a sufficient vapor pressure of a few Torrs. The vapor pressure of the organic substances in the vessel 1 must be above $10^{-3}$ Torr. The pressure of a customary pump oil, therefore, is not sufficient to produce adherence-improving intermediate layers. Of the great number of usable organic substances, which have a particularly good effect in connection with glass as an inorganic substance and PMMA, polycarbonate and CR39 as a substratum are those which have the content of Si, preferably in a SiO bond, for instance, silicate acid methyl or silicic acid ethylester, low boiling siloxane, some commercial silicon oil whose vapor pressure at room temperature amounts to 3 Torr or more. It is obviously also possible to employ mixtures of different substances.

Very likely the effectiveness of the adherence-layers of the invention is due to a double action. First of all, there is produced, probably owing to the high excitation state of the particles passing through the glow discharge, a strong chemical activity which leads to an intensive connection with the base, and at the same time activity centers are formed and, perhaps, also mechanical roughness which very strongly bind also the subsequent vaporized layer. Perhaps, also such areas of the surface of the plastics which, owing to chemical contamination, have poor adherence-properties are changed by the reactive organic particles. In addition, the intermediate layers appear to possess also a diffusion-restraining effect. This is true, particularly for layers produced from silicon oil. Such layers apparently are strongly non-hydroscopic and not only restrain the diffusion of water, but also, for instance, of acetone particularly aggressive, on plastics. Furthermore, the protective layer appears to be so dense that also other organic reagents are unable to attack:

TABLE OF LIFETIME (HOURS)

| Climatic Test | | Without Adhesive Layer | With |
|---|---|---|---|
| | PMMA | < 0.01 | 50 |
| | Polycarbonate | 0.5 | > 100 |
| | CR 39 | 0.5 | > 100 |

EXAMPLE 1

Glass Layer on PMMA

A plate made of PMMA is washed with a soft sponge and a mixture of a detergent and water in a proportion of 1:10 and then is flushed with distilled water, which is removed by centrifugal action. After the sample has been put into the vessel 1 (FIG. 1), the latter is evacuated until the pressure therein has been reduced to 1 × $10^{-4}$ Torr. For producing the adherence effect, a low viscous silicon oil (AK 0.65) is used, whose vapor pressure at room temperature is about 30 Torr. The supply container 4 is connected with the vessel 1 by a dosing valve 5. For the removal of air from the supply container 4, the latter is cooled to approximately −100° C., so that the vapor pressure of the silicon oil becomes immeasurable. The adjustable leak valve 5 is then opened and the air is pumped out until its pressure has dropped below 1 × $10^{-4}$ Torr. Thereupon, the substratum is heated to 60° C., then valve 8 is closed which leads to the main diffusion pump, and valve 9 leading to a small auxiliary diffusion pump of 10 l/sec. pumping speed is opened. This pump can easily be cleaned. In this manner one avoids a contamination of the oil in the main pump. The sample is positioned on a rotating supporting device. It is disposed 80 mm. above the glow electrode 3 of approximately 100 cm$^2$ which is supported by an insulating glass base. The voltage is adjusted to $-2$ kV and valve 5 is opened until the glow discharge current amounts to 10 mA. A vacuummeter calibrated with air indicates then a pressure of silicon oil of approximately $4.5 \times 10^{-2}$ Torr. The deep blue color of the glow discharge indicates the absence of $O_2$ and $N_2$. After 3 minutes, the adjustable lead valve and the valve leading to the auxiliary diffusion pump are closed. After this period, the layer polymerized by the glow discharge has a sufficient thickness to yield good adherence. The main valve is opened and the vessel is evacuated to below $1 \times 10^{-4}$ Torr. With an electron beam gun, one now vaporizes the evaporation glass at a rate of about 50 A/sec. Subsequently, the sample, which has a temperature of 60° C., is moved over the vaporization source. After the desired thickness of the layer of $2\mu$ has been reached, which is determined by an optical method, the main valve is closed. After 5 minutes, the sample can be removed.

EXAMPLE 2

Glass Layer on Polycarbonate

Cleaning of the substratum is effected in the same manner as in Example 1. As primer silicic methylester is employed, whose vapor pressure at room temperature is greater than 10 Torr. It is in container 4, which is connected with the vessel 1 by valve 5. The removal of air from the container 4 and the heating of the sample take place as in Example 1. The voltage is adjusted to $-1.5$ kV and the valve is opened sufficiently until the glow discharge current amounts to 10 mA. A vacuum-measuring instrument calibrated with air will then indicated a pressure of $5.5 \times 10^{-2}$ Torr. The blue color of the glow discharge indicates the absence of $O_2$ and $N_2$. The glow polymerization operation has a duration of 3 minutes. The production of the glass layer takes place as described in Example 1.

EXAMPLE 3

Glass Layer on PMMA

Cleaning of the substratum takes place in the same manner as in Example 1. As primer a rather viscous silicon oil AK 5 is employed, whose vapor pressure at room temperature is only about 3 Torr. It is disposed in a heatable container, which is connected by a likewise heatable pipe with the vessel and can be closed by a cock. During the evacuation of the vessel 1, the cock remains closed. As soon as the pressure of $1 \times 10^{-4}$ Torr has been reached, the cock is opened and any air which still may be in the supply container is pumped out. After a short period of time the cock is closed. In view of the relative small vapor pressure, the silicon oil hardly evaporates. When the pressure in vessel 1 has dropped below $1 \times 10^{-4}$ Torr, the substratum is heated to 60° C., and the auxiliary pump is disconnected from vessel 1. The voltage is adjusted to $-2.5$ kV and the adjustable leak valve is opened so far that the glow discharge current amounts to 20 mA. A vacuummeter calibrated with air will then indicate a pressure of the silicon oil of about $12 \times 10^{-2}$ Torr. The deep blue color of the glow discharge indicates the absence of $O_2$ and $N_2$. The glow polymerization operation has a duration of 2 minutes. The production of the glass layer takes place in the same manner as described in Example 1.

What we claim is:

1. A method of improving the adherence of hard inorganic layers which are vaporized in vacuum and deposited on substrata of plastics, wherein the improvement comprises the step of providing an intermediate layer between said substratum and said inorganic layer, said intermediate layer being produced by polymerization of a low molecular organic vapor by means of a glow discharge in said low molecular organic vapor, whereby said intermediate layer is deposited on said substratum, whereupon said inorganic layer is deposited on said intermediate layer.

2. A method of improving the adherence of glass layers which are vaporized in vacuum and deposited on substrata of plastics, wherein the improvement comprises the step of providing an intermediate layer between said substratum and said glass layer, said intermediate layer being produced by polymerization of a low molecular organic vapor by means of a glow discharge in said low molecular organic vapor, whereby said intermediate layer is deposited on said substratum, whereupon said glass layer is deposited on said intermediate layer.

3. A method of improving the adherence of hard inorganic layers which are vaporized in vacuum and deposited on substrata of plastics, wherein the improvement comprises the step of providing an intermediate layer between said substratum and said inorganic layer, said intermediate layer being produced by polimerization of a low molecular Si containing organic vapor by means of a glow discharge in said Si containing low molecular organic vapor, whereby said intermediate layer is deposited on said substratum, whereupon said inorganic layer is deposited on said intermediate layer.

4. A method of improving the adherence of glass layers which are vaporized in vacuum and deposited on substrata of plastics, wherein the improvement comprises the step of providing an intermediate layer between said substratum and said glass layer, said intermediate layer being produced by polymerization of a low molecular Si containing organic vapor by means of a glow discharge in said Si containing low molecular organic vapor whereby said intermediate layer is deposited on said substratum, whereupon said glass layer is deposited on said intermediate layer.

5. A method of improving the adherence of glass layers which are vaporized in vacuum and deposited on substrata of plastics, wherein the improvement comprises the step of providing an intermediate layer between said substratum and said glass layer, said intermediate layer being produced by polymerization of a low molecular organic vapor containing at least one member of the group consisting of an ester of silicic acid and a low boiling silicon oil, by means of a glow discharge in said low molecular organic vapor containing at least one member of the group consisting of an ester of silicic acid and a low boiling silicon oil, whereby said intermediate layer is deposited on said substratum, whereupon said glass layer is deposited on said intermediate layer.

6. A method of improving the adherence of hard inorganic layers which are vaporized in vacuum and deposited on substrata of plastics, wherein the improvement comprises the step of providing an intermediate layer between said substratum and said inorganic layer, said intermediate layer being produced by polymerization of a low molecular organic vapor by means of a glow discharge in said low molecular organic vapor, whereby said intermediate layer is deposited on said substratum, said glow discharge being performed in an organic vapor the partial pressure of which during the glow discharge is higher than $10^{-3}$ Torr when determined by a vacuummeter calibrated with air, whereupon said inorganic layer is deposited on said intermediate layer.

7. A method of improving the adherence of hard inorganic layers which are vaporized in vacuum and deposited on substrata of plastics, wherein the improvement comprises the step of providing an intermediate layer between said substratum and said inorganic layer, said intermediate layer being produced by polymerization of a low molecular organic vapor by means of a glow discharge in said low molecular organic vapor, whereby said intermediate layer is deposited on said substratum to a thickness of 30 to 400 Å, whereupon said inorganic layer is deposited on said intermediate layer.

* * * * *